United States Patent
Hachtmann et al.

(10) Patent No.: US 10,518,876 B2
(45) Date of Patent: *Dec. 31, 2019

(54) OFFSHORE WIND KITE WITH SEAFLOOR MOORING

(71) Applicant: Makani Technologies LLC, Alameda, CA (US)

(72) Inventors: Brian Hachtmann, Mountain View, CA (US); Fort Felker, Mountain View, CA (US); Charles Nordstrom, Mountain View, CA (US)

(73) Assignee: Makani Technologies LLC, Alameda, CA (US)

( * ) Notice: Subject to any disclaimer, the term of this patent is extended or adjusted under 35 U.S.C. 154(b) by 260 days.

This patent is subject to a terminal disclaimer.

(21) Appl. No.: 15/387,261

(22) Filed: Dec. 21, 2016

(65) Prior Publication Data

US 2018/0170537 A1   Jun. 21, 2018

(51) Int. Cl.
| | |
|---|---|
| *B64C 39/02* | (2006.01) |
| *B63B 35/50* | (2006.01) |
| *B63B 21/50* | (2006.01) |
| *G05D 1/06* | (2006.01) |
| *F03D 9/25* | (2016.01) |
| *B64F 3/00* | (2006.01) |
| *F03D 9/32* | (2016.01) |
| *F03D 5/00* | (2006.01) |

(Continued)

(52) U.S. Cl.
CPC ............ *B64C 39/022* (2013.01); *B63B 21/50* (2013.01); *B63B 35/50* (2013.01); *B64F 3/00* (2013.01); *F03D 9/25* (2016.05); *G05D 1/0684* (2013.01); *B64F 3/02* (2013.01); *F03D 5/00* (2013.01); *F03D 9/32* (2016.05); *F03D 13/25* (2016.05); *F05B 2240/921* (2013.01); *F05B 2240/923* (2013.01); *F05B 2240/93* (2013.01); *Y02E 10/725* (2013.01)

(58) Field of Classification Search
CPC ......... B64F 3/00; B64C 39/022; B63B 35/50; F03D 13/25
See application file for complete search history.

(56) References Cited

U.S. PATENT DOCUMENTS

| | | | |
|---|---|---|---|
| 7,296,971 B2 | 11/2007 | Borgen | |
| 7,337,726 B2 * | 3/2008 | Wobben | .................... B61B 7/00 104/112 |

(Continued)

FOREIGN PATENT DOCUMENTS

KR        2017082384 A  *  7/2017 ............. B63B 35/50

OTHER PUBLICATIONS

Written Opinion, International Application No. PCT/US2017/056326, dated Jan. 25, 2016.

*Primary Examiner* — Joseph W Sanderson
(74) *Attorney, Agent, or Firm* — McDonnell Boehnen Hulbert & Berghoff LLP (57) ABSTRACT

Systems and methods for operating aerial vehicles in water-based locations. The systems and methods include a plurality of landing stations. Each landing station of the plurality of landing stations is coupled to at least one of: another landing station or an underwater mooring point. The systems and methods also include an aerial vehicle coupled to a tether mooring point by a tether. The aerial vehicle is configured to land on at least one landing station of the plurality of landing stations.

20 Claims, 8 Drawing Sheets

Side View (51) Int. Cl.
   *F03D 13/25*     (2016.01)
   *B64F 3/02*      (2006.01)

(56) References Cited

U.S. PATENT DOCUMENTS

| | | | |
|---|---|---|---|
| 7,456,515 B2 | 11/2008 | Nielsen | |
| 7,504,741 B2 | 3/2009 | Wrage et al. | |
| 8,888,049 B2 * | 11/2014 | Vander Lind | B64C 31/06 244/153 R |
| 8,931,144 B2 * | 1/2015 | Freeman | A63H 30/02 24/298 |
| 9,003,631 B2 | 4/2015 | Yamamoto et al. | |
| 9,139,310 B1 | 9/2015 | Wang | |
| 9,284,062 B2 * | 3/2016 | Wang | B60L 11/1809 |
| 9,308,975 B2 * | 4/2016 | Vander Lind | B64C 39/022 |
| 9,353,033 B2 * | 5/2016 | Vander Lind | B63H 9/0685 |
| 9,568,919 B2 * | 2/2017 | Lim | G05D 1/0684 |
| 9,598,170 B2 * | 3/2017 | Vander Lind | B64C 31/06 |
| 2008/0240864 A1 | 10/2008 | Belinsky | |
| 2010/0032948 A1 | 2/2010 | Bevirt | |
| 2010/0230965 A1 * | 9/2010 | Pitre | F03B 13/186 290/42 |
| 2013/0152839 A1 * | 6/2013 | Graf | B63B 21/50 114/125 |
| 2013/0221679 A1 * | 8/2013 | Vander Lind | B64C 31/06 290/55 |
| 2014/0259549 A1 * | 9/2014 | Freeman | A63H 30/02 24/298 |
| 2015/0183516 A1 * | 7/2015 | Vander Lind | B64C 39/022 244/155 R |
| 2015/0210386 A1 * | 7/2015 | Vander Lind | B64C 31/06 244/110 C |
| 2015/0275861 A1 * | 10/2015 | Goldstein | B64B 1/50 290/44 |
| 2015/0298806 A1 * | 10/2015 | Vander Lind | B63H 9/0685 518/704 |
| 2016/0318628 A1 | 11/2016 | Vander Lind | |
| 2017/0191467 A1 * | 7/2017 | Miller | F03D 9/10 |
| 2017/0248125 A1 * | 8/2017 | Luchsinger | F03D 9/32 |
| 2017/0363066 A1 * | 12/2017 | Hart | F03D 9/25 |
| 2017/0363067 A1 * | 12/2017 | Hart | F03D 9/32 |
| 2017/0363069 A1 * | 12/2017 | Hart | F03D 13/25 |
| 2017/0363070 A1 * | 12/2017 | Hart | F03D 13/25 |
| 2018/0149137 A1 * | 5/2018 | Nordstrom | F03D 9/255 |
| 2018/0156199 A1 * | 6/2018 | Nelson | F03D 9/25 |
| 2018/0170537 A1 * | 6/2018 | Hachtmann | B64C 39/022 |

* cited by examiner

Side View

Figure 3A

Side View

OFFSHORE WIND KITE WITH SEAFLOOR MOORING

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

The present disclosure generally relates to systems and methods that incorporate aerial vehicles such as those employed in crosswind aerial vehicle systems. Crosswind aerial vehicle systems may extract useful power from the wind for various purposes such as, for example, generating electricity, lifting or towing objects or vehicles, etc. In some embodiments, the aerial vehicles may be operated above bodies of water, such as oceans, lakes, rivers, etc. Beneficially, embodiments described herein may provide expanded operating areas/regions for aerial vehicles.

In an aspect, a system is provided. The system includes a plurality of landing stations. Each landing station of the plurality of landing stations is coupled to at least one of: another landing station or an underwater mooring point. The system also includes an aerial vehicle coupled to a tether mooring point by a tether. The aerial vehicle is configured to land on at least one landing station of the plurality of landing stations.

In a further aspect, an aerial vehicle is provided. The aerial vehicle includes an airframe. The airframe is coupled to a tether mooring point by a tether. The tether mooring point is underwater. The aerial vehicle also includes a controller configured to carry out operations. The operations include selecting a landing station from a plurality of landing stations. Each landing station of the plurality of landing stations is coupled to at least one of: another landing station or an underwater mooring point. The operations also include causing the airframe to land at the selected landing station.

In a yet further aspect, a method is provided. The method includes receiving information about at least one of: a possible landing location for an aerial vehicle or a flight condition of the aerial vehicle. The aerial vehicle is coupled to an underwater tether mooring point by a tether. The method also includes, based on the received information, identifying a target landing location for the aerial vehicle. The method additionally includes causing the aerial vehicle to land at the target landing location.

Other aspects, embodiments, and implementations will become apparent to those of ordinary skill in the art by reading the following detailed description, with reference where appropriate to the accompanying drawings.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Embodiments described herein relate to a system for over-water operation of a tethered aerial vehicle. Namely, an offshore, or over-water, wind kite may be moored directly to a seafloor location by a tether without the use of a floating anchor platform. In an example embodiment, the system may additionally include a landing station or an array (N+2) of landing stations that may be located downwind from the underwater tether mooring point. The landing stations can include floating buoys or platforms. In an example embodiment, the landing stations may be distributed or arranged such that, for N kites, there are N+2 landing stations. For instance, each tether mooring point can be located substantially at the center of three landing stations.

In an example embodiment, the landing stations can be disposed at a 120 degree azimuth from one another with respect to the tether mooring point. Other angles are possible and contemplated. For example, four landing stations can be arranged about the tether mooring point with 90 degree azimuth increments. In some embodiments, the landing stations may be disposed at approximately a single tether length from the tether mooring point, taking into account water depth and landing station size. The landing station array may include a hexagonal close-packed arrangement with surface or near-surface connector members that run between the platforms or buoys. The array of landing stations/tether points may be anchored to the seafloor, or another fixed point, by one or more large drag anchors. In one embodiment, the drag anchors may be arranged around a perimeter of the array.

In an example embodiment, the aerial vehicle may be configured to fly at ±60 degrees relative to the wind. As such, an array of landing stations arrayed at 120 degrees azimuth (with respect to the tether mooring point) may provide a landing station "within reach" of the aerial vehicle regardless of prevailing wind direction. Embodiments may eliminate a fixed ground station altogether, leaving only an array of landing buoys or platforms. Furthermore, each landing station may have little or no machinery and need not require power, except for navigational lighting/beacons. In some example, the landing stations may generate electrical power from solar panels or a wind turbine.

II. Example Systems

Figure 1:
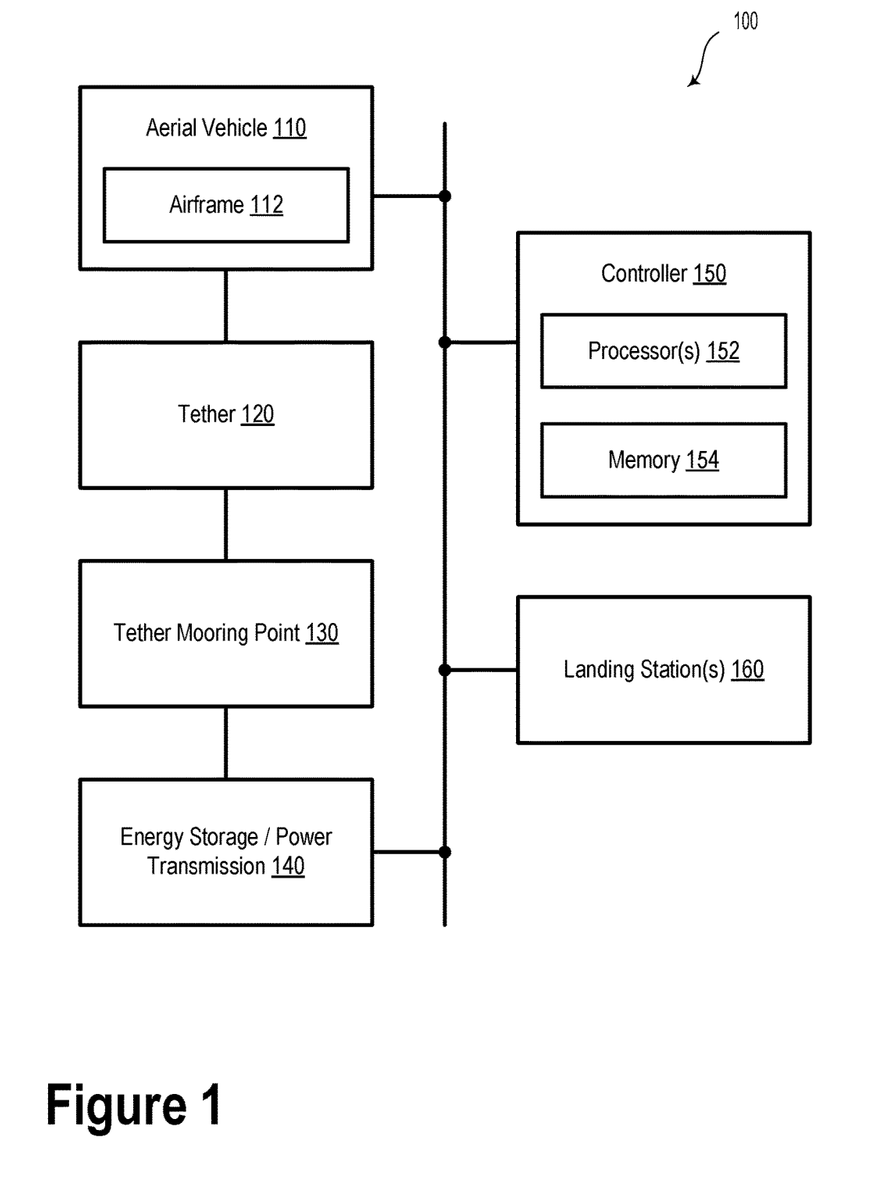
FIG. 1 illustrates a system, according to an example embodiment.

FIG. 1 illustrates a schematic diagram of system 100, according to an example embodiment. System 100 may include an aerial vehicle 110. The aerial vehicle 110 may include or take the form of various types of devices, such as a kite, a helicopter, a wing and/or an airplane, among other possibilities. The aerial vehicle 110 may be formed of structures including metal, plastic and/or other polymers. The aerial vehicle 110 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

The aerial vehicle 110 may be coupled to a first portion of a tether 120. In an example embodiment, the tether 120 may include two or more bridle segments, which may be coupled to various bridle attachment points on the aerial vehicle 110.

As an example, the tether 120 may include a core configured to withstand one or more forces of the aerial vehicle 110 when the aerial vehicle 110 is in hover flight, forward flight, and/or crosswind flight modes. The core may be constructed of any high strength fibers (e.g., carbon fiber, carbon nanotubes, polymer fibers, or another type of structural fiber). In some examples, the tether 120 may have a fixed length and/or a variable length. For instance, in at least one such example, the tether 120 may have a length of 140 meters. Other lengths of tether 120 are possible and contemplated.

In an example embodiment, the aerial vehicle 110 may include at least one hybrid electric motor configured to generate electricity while the aerial vehicle is operating in a crosswind flight mode. That is, the aerial vehicle 110 may be operable to convert wind energy to electrical energy in an electrical energy generation operating mode.

The tether 120 may transmit electricity to the aerial vehicle 110 in order to power the aerial vehicle 110 for takeoff, landing, hover flight, and/or forward flight. The tether 120 may be constructed in any form and using any material which may allow for the transmission, delivery, and/or harnessing of electrical energy generated by the aerial vehicle 110 and/or transmission of electricity to the aerial vehicle 110. The tether 120 may also be configured to withstand one or more forces of the aerial vehicle 110 when the aerial vehicle 110 is in an operational mode.

The tether 120 may transmit electrical energy generated by the aerial vehicle 110. For example, the tether 120 may be configured to transmit electrical energy to an energy storage/power transmission element 140. That is, in an example embodiment, the tether 120 may provide electrical coupling between the aerial vehicle 110 and an electrical storage device. The energy storage/power transmission element 140 can include an electrical storage device such as a battery or a supercapacitor. Additionally or alternatively, the energy storage/power transmission element 140 can include an electrical conductor (a power line), a power grid, a generator, a pump, a power conversion device, or another type of electrical power element.

A second portion of the tether 120 may be coupled to a tether mooring point 130, which may be located underwater. The tether mooring point 130 and/or underwater mooring points for the landing station 160 may include an anchor, a fixed seafloor coupling, a swivel, a gimbal, a slip ring, or another type of coupling.

Additionally or alternatively, the aerial vehicle 110 may be operable to convert wind energy into a mechanical tension in the tether 120. For example, the aerial vehicle 110 may include a mechanical "pump kite." In such a scenario, the aerial vehicle 110 may be operable to fly along various flight paths, including figure-eight. Furthermore, the tether 120 may be coupled to a device operable to convert the mechanical energy in the tether 120 to electrical energy (e.g., to turn a shaft of an electrical generator).

The system 100 may include a controller 150. The controller 150 may include one or more processors 152 and a memory 154. The one or more processors 152 may be a general-purpose processor or a special-purpose processor (e.g., digital signal processors, application specific integrated circuits, etc.). The one or more processors 152 may be configured to execute computer-readable program instructions that are stored in the memory 154. As such, the one or more processors 152 may execute the program instructions to provide at least some of the functionality and operations described herein.

The memory 154 may include or take the form of one or more computer-readable storage media that may be read or accessed by the one or more processors 152. The one or more computer-readable storage media can include volatile and/or non-volatile storage components, such as optical, magnetic, organic or other memory or disc storage, which may be integrated in whole or in part with at least one of the one or more processors 152. In some embodiments, the memory 154 may be implemented using a single physical device (e.g., one optical, magnetic, organic or other memory or disc storage unit), while in other embodiments, the memory 154 can be implemented using two or more physical devices.

As noted, the memory 154 may include computer-readable program instructions and perhaps additional data, such as diagnostic data relating to aerial vehicle 110. As such, the memory 154 may include program instructions to perform or facilitate some or all of the functionality described herein.

The system 100 may include one or more landing stations 160. In an example embodiment, each landing station 160 of a plurality of landing stations may be coupled to at least one of: another landing station or an underwater mooring point. In an example embodiment, the landing station 160 may include a spar buoy, a floating landing platform, or another type of floating structure.

The landing station 160 may include a perch, a platform, or another suitable anchoring surface or member. The landing station 160 may be formed of any material that can suitably keep the aerial vehicle 110 attached and/or anchored to the landing station 160 while the aerial vehicle 100 is not conducting flight operations.

In an example embodiment, the aerial vehicle 110 may be configured to land on the landing station 160. That is, the landing station 160 may receive the aerial vehicle 110 during a landing operation. The landing station 160 may be used to hold and/or support the aerial vehicle 110 until it is in an operational flight mode. In an example embodiment, the landing station 160 may provide a safe landing location for the aerial vehicle 100 in the event of a storm or other conditions that are not suitable for flight operations. For example, if a wind speed (e.g., measured by a weather station on the landing station 160) exceeds a threshold wind speed (e.g., 160 kilometers per hour), the aerial vehicle 110 and/or controller 150 may select a landing station 160 from a plurality of landing stations. The aerial vehicle 100 may land at the selected landing station 160 to reduce the risk of damage to the aerial vehicle 110 or other parts of the system (e.g., the tether 120 and/or the tether mooring point 130).

In some embodiments, after receiving an aerial vehicle 110, the landing station 160 may also be configured to allow for the repositioning of the aerial vehicle 110 such that redeployment of the device is possible. That is, aerial vehicle 110 may be configured to perform takeoff operations from and landing operations to the landing station 160. For instance, the landing station 160 may receive the aerial vehicle 110 for landing in a first orientation and adjust the aerial vehicle 110 to a second orientation for takeoff/launch operations.

In an example embodiment, a landing station 160 may be configured to receive a plurality of aerial vehicles concurrently using, for example, multiple perch locations. For instance, a given landing station 160 may be configured to provide concurrent landing facilities (e.g., perches) for two, three, or more aerial vehicles 110.

Two or more elements of system 100 may be communicatively coupled using a communication interface. The communication interface may include one or more wireless interfaces and/or one or more wired interfaces. As an example, such a communication interface may provide a communication link between the landing station 160 and the aerial vehicle 110 using one or more networks. As described herein, wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Wired interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The landing station 160 may communicate with the aerial vehicle 110, other landing stations, and/or other entities (e.g., a command center) using the communication system.

Figure 2:
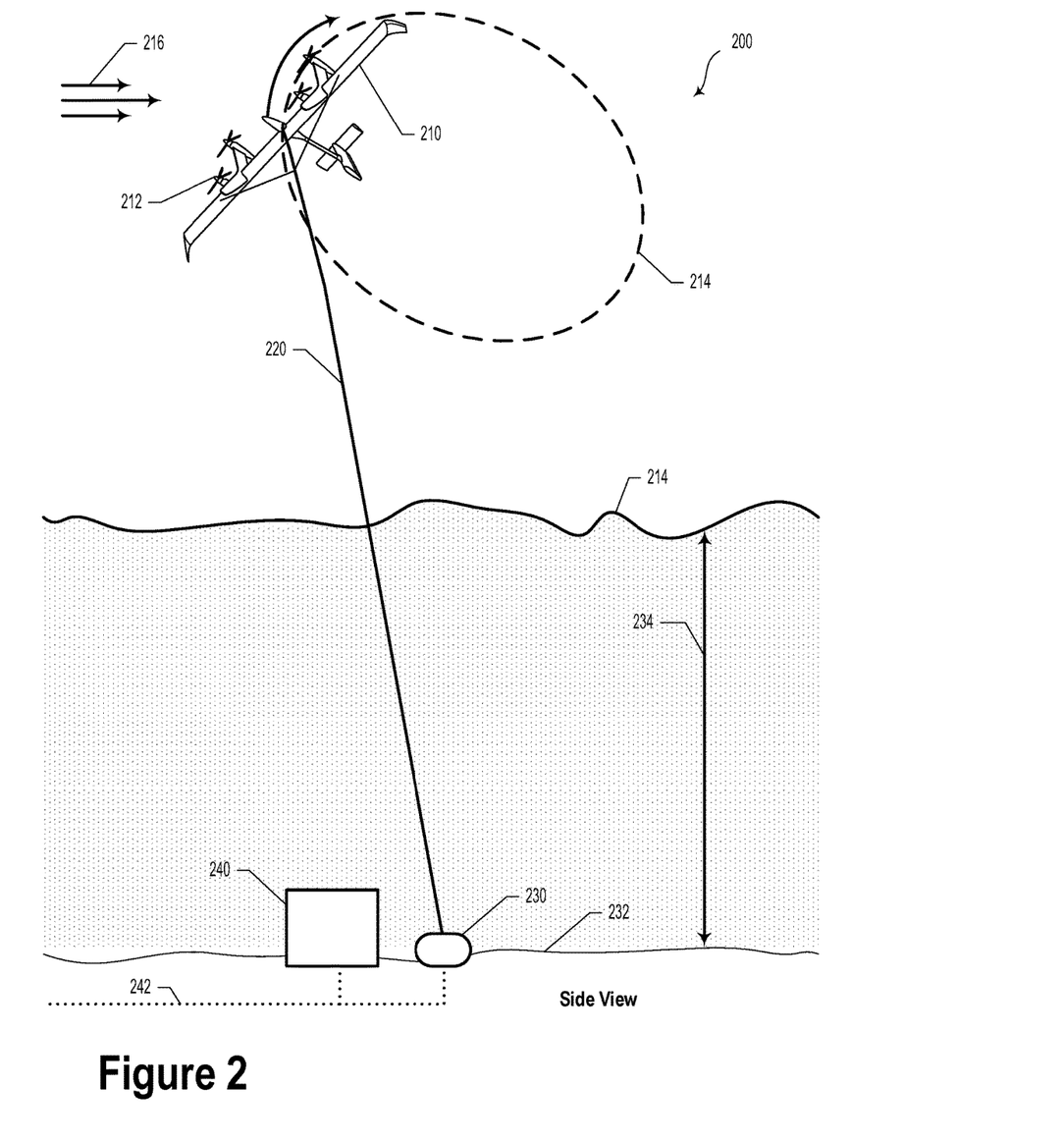
FIG. 2 illustrates a system, according to an example embodiment.

FIG. 2 illustrates a side view of system 200, according to an example embodiment. System 200 may include at least some of the elements of system 100 as illustrated and described in relation to FIG. 1. For example, system 200 includes an aerial vehicle 210, which may include one or more hybrid drives 212 that may be operable to generate electrical energy and/or thrust for the aerial vehicle 210.

The aerial vehicle 210 may be configured to fly substantially along a path 214 to generate electrical energy. The path 214 may include a substantially circular shape or another curved shape. For example, path 214 may include an oval-shaped flight pattern oriented substantially perpendicular to a prevailing wind direction 216, however other orientations are possible. The term "substantially along," as used in this disclosure, refers to exactly along and/or one or more deviations from exactly along that do not significantly impact generation of electrical energy as described herein.

The path 214 may include a variety of shapes in different embodiments. For example, the path 214 may be substantially circular. And in at least one such example, the path 214 may have a radius of up to 265 meters. The term "substantially circular," as used in this disclosure, refers to exactly circular and/or one or more deviations from exactly circular that do not significantly impact generation of electrical energy as described herein. Other shapes for the path 214 may be an oval, such as an ellipse, the shape of the numeral 8 ("a figure-eight"), etc.

As described herein, the aerial vehicle 210 may be coupled to a tether mooring point 230 by a tether 220. Namely, the tether mooring point 230 may be under a water surface 214 and along, or adjacent to, a seafloor 232 (e.g., ocean bottom, lake bottom, etc.).

In some embodiments, the tether 220 may provide an electrical connection to the aerial vehicle 210. Furthermore, the tether 220 may be electrically coupled to an energy storage device 240 and/or an electrical transmission system 242 (e.g., a power grid, a power distribution system, etc.).

While not illustrated herein, it is contemplated that a length of tether 220 may be adjusted by a tether reel or another type of winding mechanism. The tether reel, which may be located between the tether mooring point 230 and the aerial vehicle 210, can provide a controllable length for the tether 220. In other embodiments, tether 220 may have a fixed length. The length of tether 220 may be based, at least in part, on a depth 234 of the tether mooring point 230.

Figure 3A:
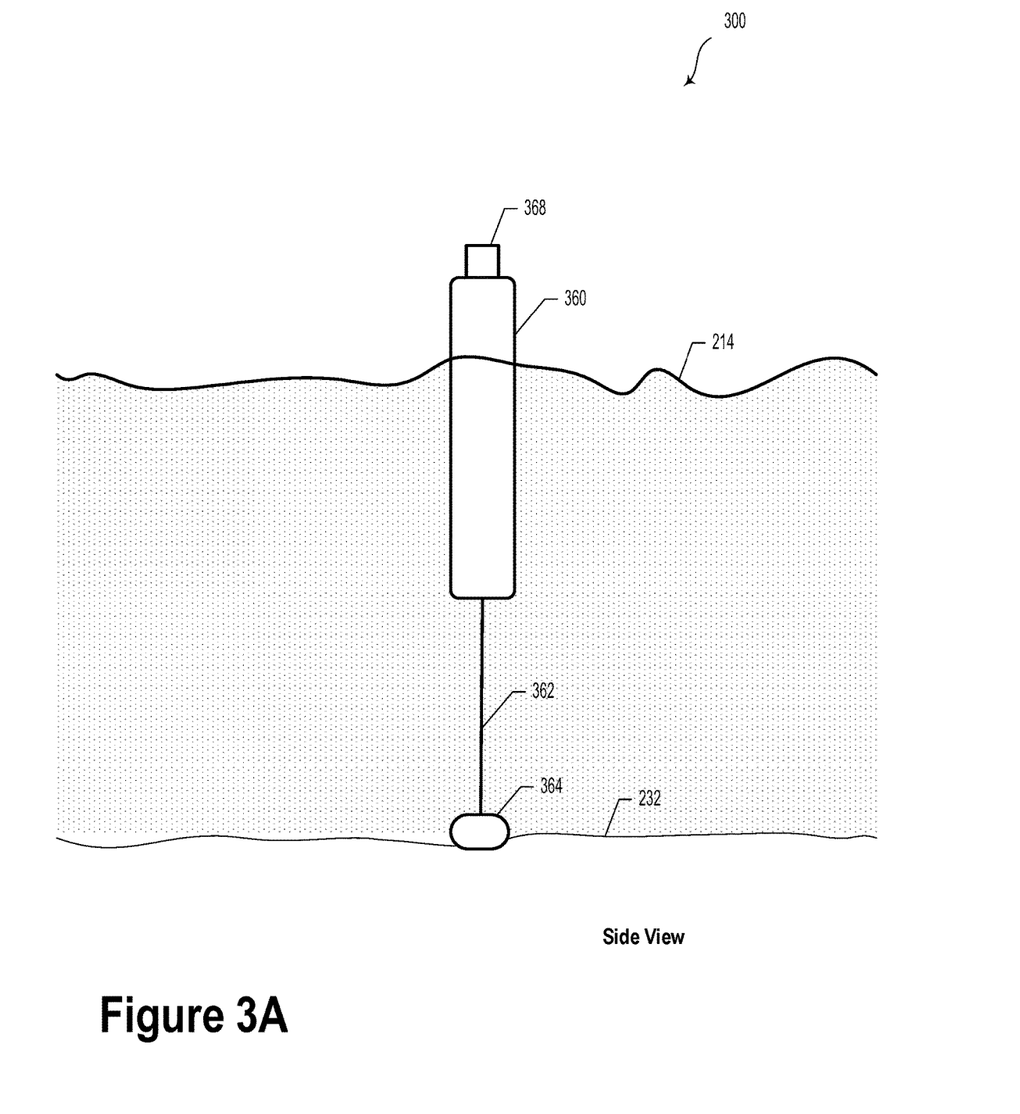
FIG. 3A illustrates a landing station, according to an example embodiment.

In some embodiments, the aerial vehicle 210 can include landing gear or another type of structure suitable for stabilizing and/or anchoring the aerial vehicle 210 to a surface or structure during non-flight operations. For example, the landing gear may include a gripper mechanism configured to couple to a perch structure. In another example embodiment, the landing gear may include tires, legs, and/or skids. Yet further, the landing gear may be configured to engage with at least a portion (e.g., a landing perch 368) of the landing station 300 described below.

Figure 3B:
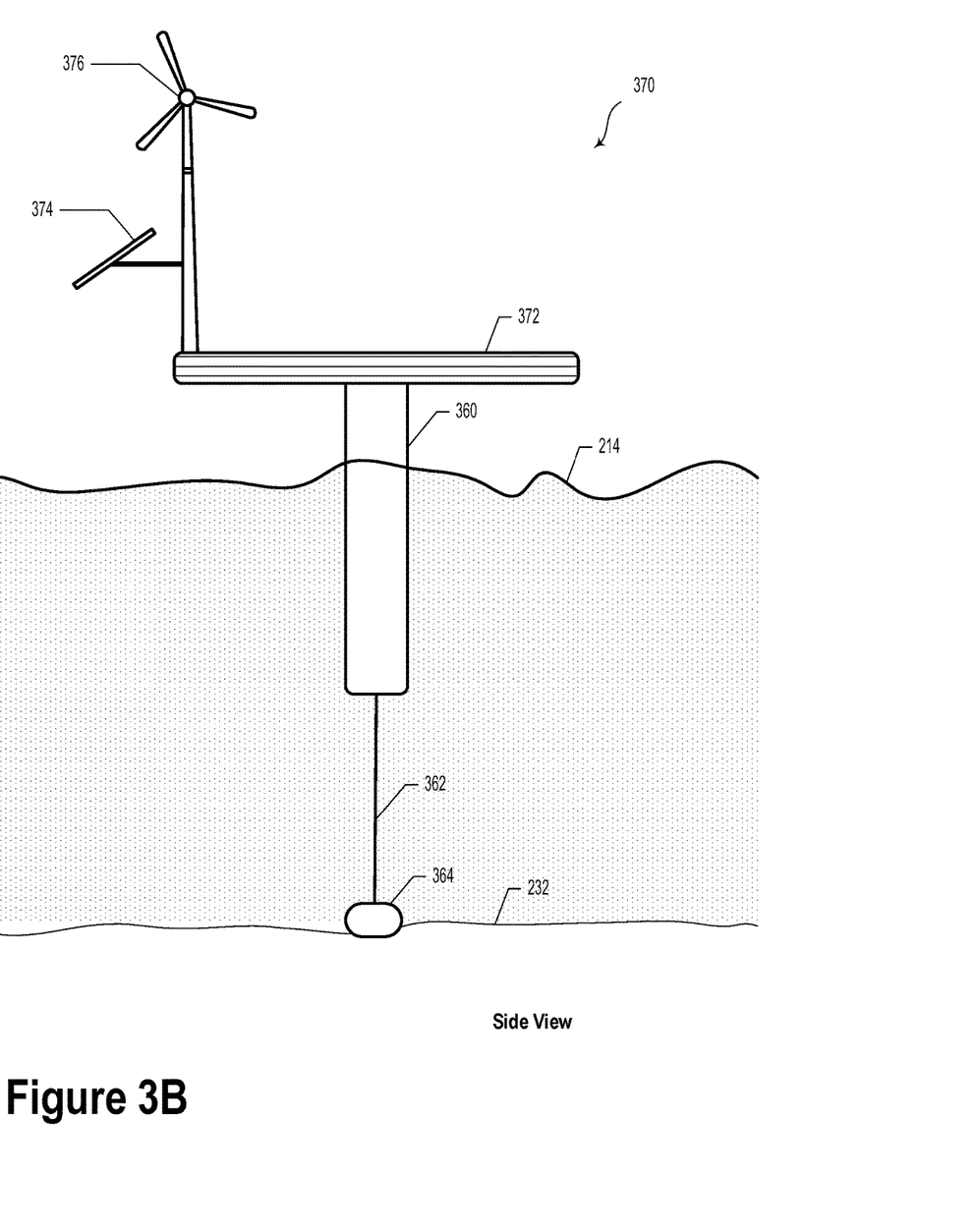
FIG. 3B illustrates a landing station, according to an example embodiment.

FIGS. 3A and 3B illustrate side views of several embodiments of landing stations, which may include various floating structures configured to receive aerial vehicles. As illustrated, each landing station may be configured to receive one aerial vehicle during non-flight operations. However, it is understood that landing stations may have a landing capacity of greater than one aerial vehicle. For instance, a landing station may be configured to receive two or more aerial vehicles.

FIG. 3A illustrates a landing station 300, according to an example embodiment. The landing station 300 may be similar or identical to landing station 160 as illustrated and described in relation to FIG. 1. The landing station 300 may include a floating structure 360, which may include a spar buoy; however other types of floating structures are contemplated. The floating structure 360 may include a landing perch 368. The landing perch 368 may include a fixed arm, a moveable arm, a net, a peg, or another type of structure configured to receive an aerial vehicle during landing operations.

The landing station 300 may include a single anchor leg mooring (SALM) 362. As an example, the SALM 362 may couple the floating structure 360 to an anchor 364 or another type of fixed coupling proximate to the seafloor 232. Additionally or alternatively, the floating structure 360 may be moored by a catenary anchor leg mooring (CALM). Other mooring arrangements are contemplated for the landing station 300. For example, the floating structure 360 may be coupled to one or more other floating structures by a lateral coupling (e.g., a lateral tether or catenary), which may be disposed above, at, and/or below water level.

FIG. 3B illustrates a landing station 370, according to an example embodiment. Landing station 370 includes a floating structure 360 that may be coupled to a platform 372. Landing station 370 may additionally include one or more solar panels 374 and/or one or more wind turbines 376. As such, the landing station 370 may be configured to generate at least some electrical power.

Figure 4:
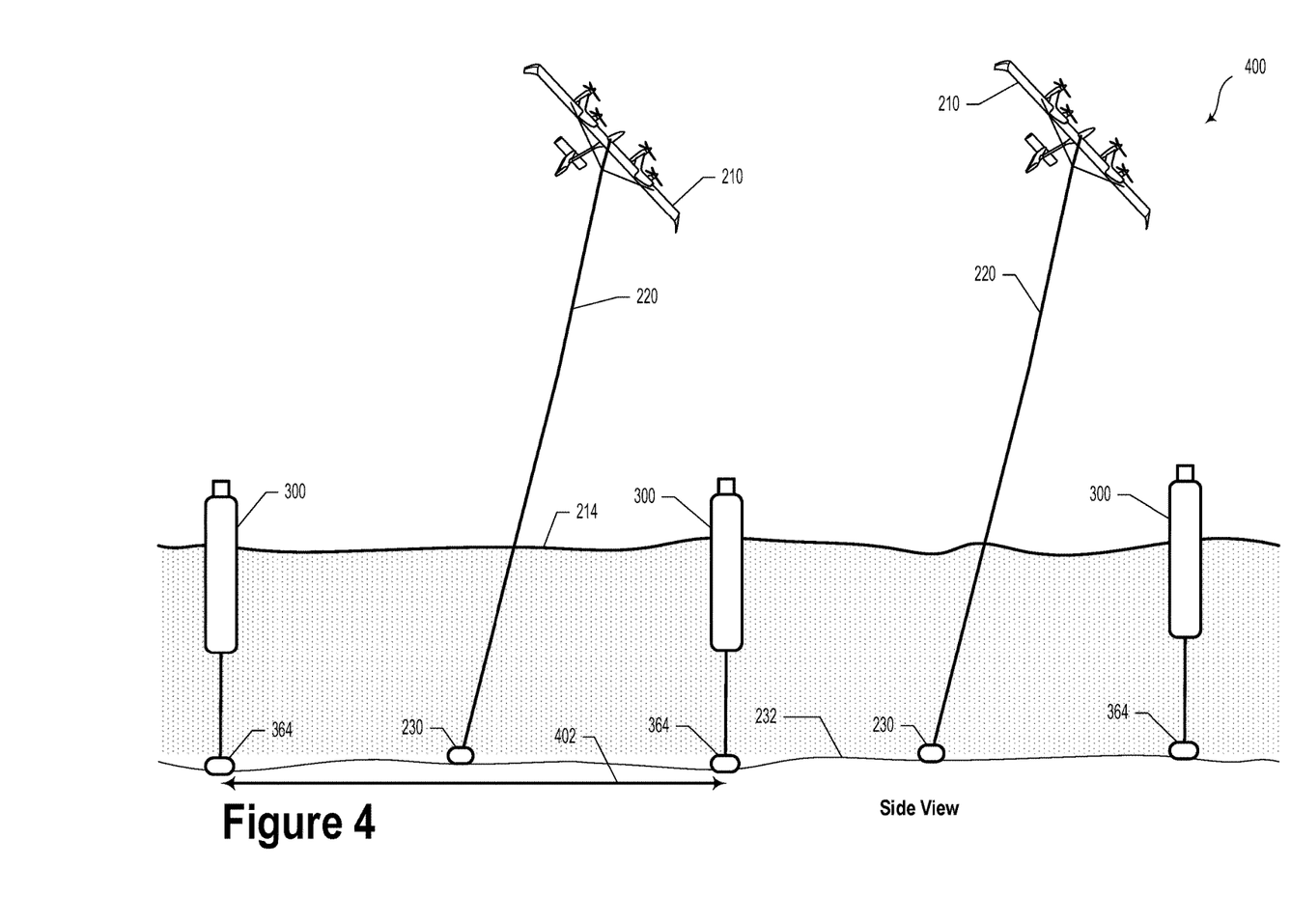
FIG. 4 illustrates a system, according to an example embodiment.

FIG. 4 illustrates a side view of a system 400, according to an example embodiment. System 400 may include elements from systems 100, 200, 300, and 370 as illustrated and described in relation to FIGS. 1, 2, 3A, and 3B. Namely, system 400 may include a plurality of aerial vehicles 210, which may be attached to respective tethers 220 and their respective tether mooring points 230.

System 400 also includes a plurality of landing stations 300 that are arranged about respective tether mooring points 230. For example, at least three landing stations 300 may be arranged about each respective tether mooring point 230 with a 120 degree azimuth spacing between adjacent landing stations 300. The landing stations 300 may be moored to respective mooring locations 364. A distance 402 between the landing station mooring locations 364 may be based on a length of the tether 220 and a depth of the tether mooring location 230.

In an example embodiment, the plurality of landing stations 300 may be arranged in substantially a hexagonal-close packed (HCP) arrangement. Other geometrical arrangements square array, linear array, octagonal arrays, etc. are possible.

Figure 5:
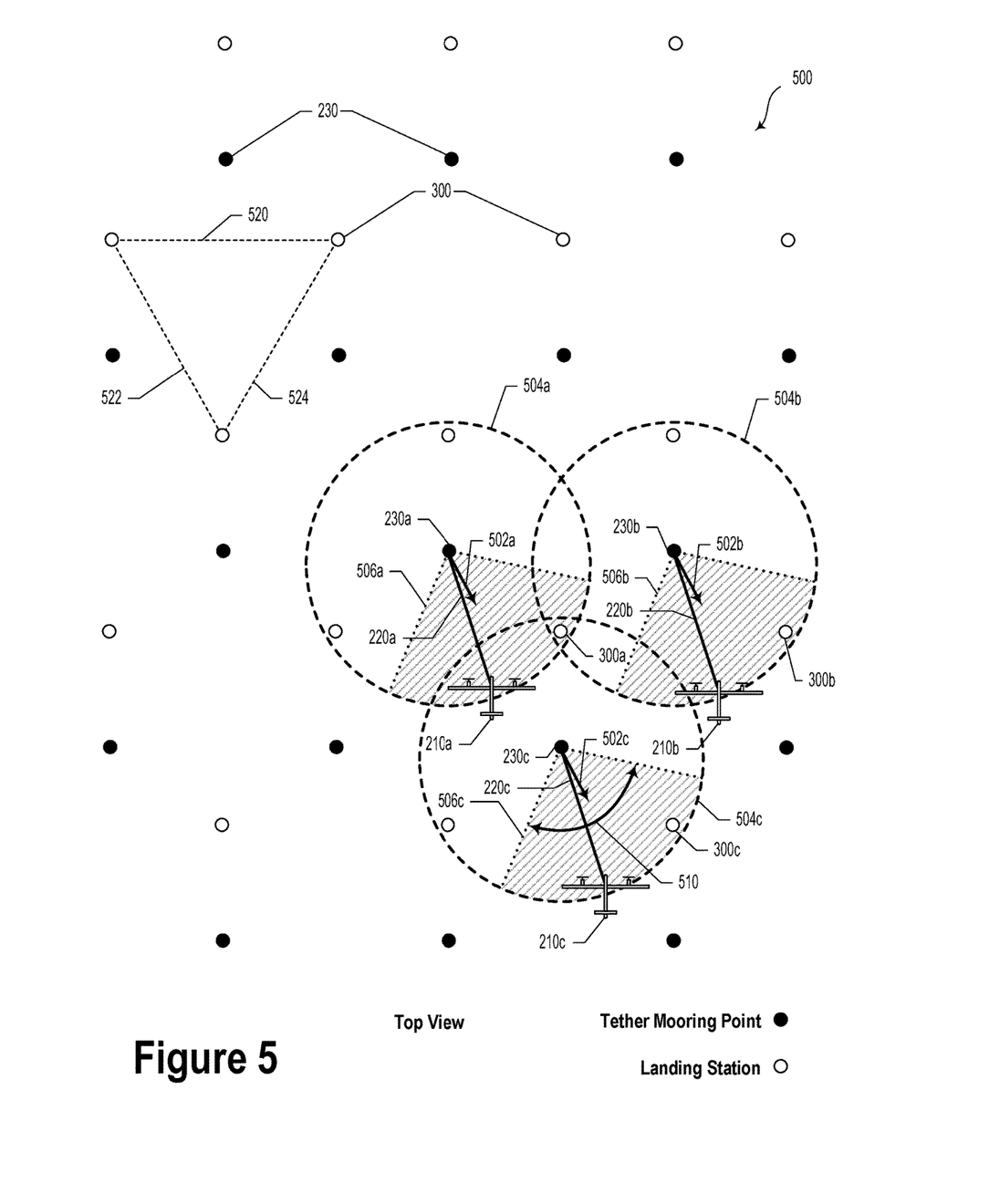
FIG. 5 illustrates a system, according to an example embodiment.

FIG. 5 illustrates an overhead view of system 500, according to an example embodiment. System 500 may include elements that are similar or identical to corresponding elements of systems 100, 200, 300, 370, and 400 as illustrated and described in relation to FIGS. 1, 2, 3A, 3B, and 4. System 500 includes an arrangement of a plurality of tether mooring points 230 and a plurality of landing stations 300. In an example embodiment, system 500 may include a plurality of aerial vehicles (e.g., 210$a$-$c$) that are attached to the respective tether mooring points 230$a$-$c$ by respective tethers 220$a$-220$c$.

A prevailing wind direction 502$a$-$c$ may be measured, for example, by the aerial vehicle 210$a$-$c$ or by one or more landing stations 300. Additionally or alternatively, the prevailing wind direction 502$a$-$c$ can be received from other sources of weather information.

Based on the prevailing wind direction 502$a$-$c$, the respective aerial vehicles 210$a$-$c$ may be configured to fly within an operation envelope 506$a$-$c$, which may include a 120 degree angular sector centered about the wind direction 502$a$-$c$. In other words, in an example embodiment, the aerial vehicles 210$a$-$c$ may be operable to conduct tethered flight operations within an angular region ±60 degrees from the wind direction 502$a$-$c$.

In an example embodiment, for a system 500 that includes N aerial vehicles 210, the number of landing stations 300 may be at least N+2. For example, in the example illustrated in FIG. 5, for three aerial vehicles 210$a$-$c$, system 500 may include at least five landing stations 300 (e.g., seven landing stations total, with a "shared" landing station 300$a$). It is understood that many different numbers and arrangements of both aerial vehicles 210 and landing stations 300 are contemplated in the present disclosure.

For example, a plurality of landing stations 300 can be arranged in a landing station array. In such a scenario, each tether mooring point may be located within a group of three possible landing stations in the landing station array. Furthermore, one or two landing stations of the group may be "shared" with another aerial vehicle. That is, in some scenarios, neighboring aerial vehicles may land on the same landing station, based on, for example, prevailing wind conditions and/or the landing capacity of the landing station.

Furthermore, while the plurality of landing stations 300 can be arranged with a periodic shape (e.g., a hexagonal close-packed lattice or square lattice), other arrangements are possible. For instance, the plurality of landing stations can be arranged about the respective tether mooring points at a given distance based on a length of the tether 220 and a depth of the tether mooring point 230.

In some embodiments, some of the landing stations can be coupled by lateral coupling members, which may include lateral tethers 520, 522, and 524. The lateral tethers 520, 522, and 524 may be catenary members located above, at, and/or under the water surface. Additionally, as described herein, the landing station 300 can include a buoy or a floating landing platform.

In other examples, landing stations 300 can represent other types of target landing locations. For example, some target landing locations need not correspond to a physical structure for receiving an aerial vehicle. In such scenarios, the target landing location may include a water location and the aerial vehicle may be controlled to land on the water at the target landing location.

While FIG. 5 illustrates a particular number of aerial vehicles, it is understood that more or fewer aerial vehicles are possible and their tethering arrangement and locations can include many different combinations. For example, a plurality of aerial vehicles can be tethered to the same underwater tether mooring point. Furthermore, a plurality of aerial vehicles can be arranged along a given tether. As such, an arrangement of landing stations within the landing station array may vary based on such considerations.

III. Example Methods

Figure 6:
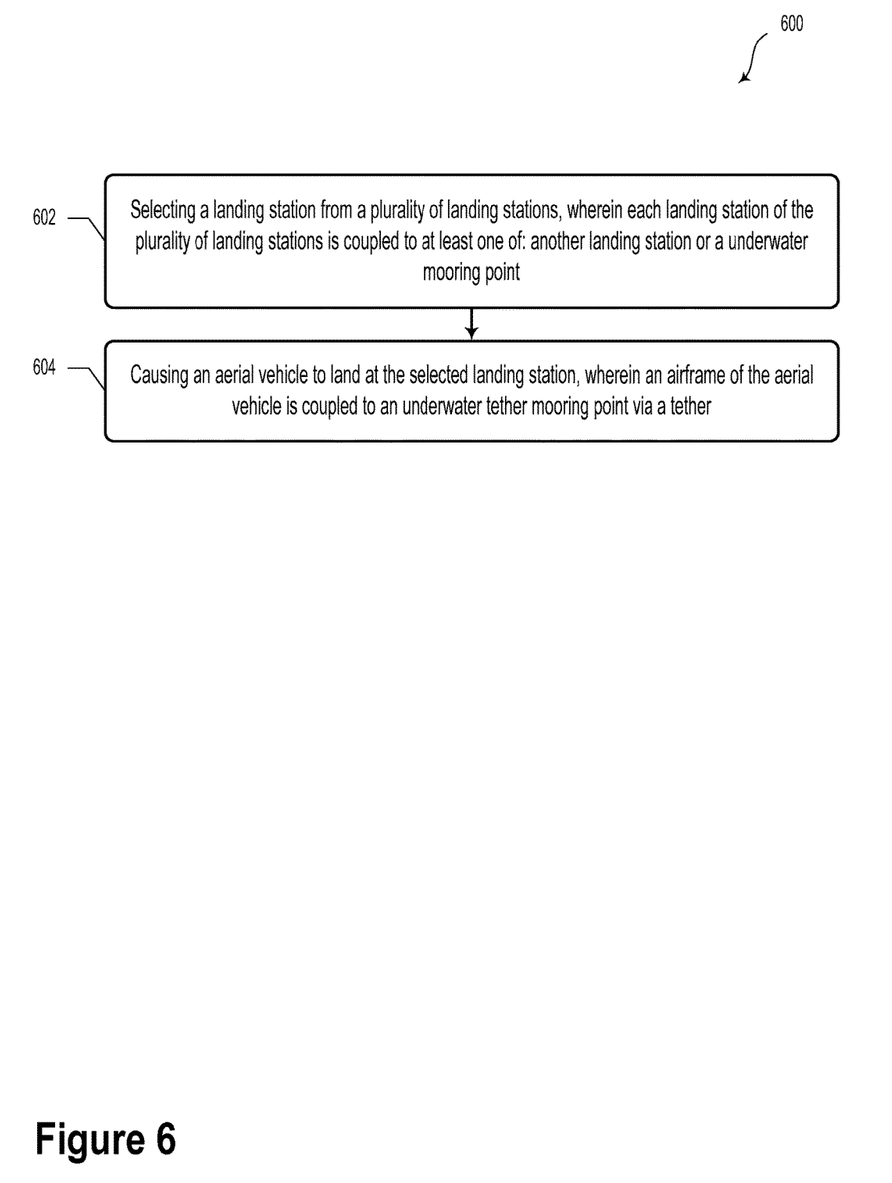
FIG. 6 illustrates a method, according to an example embodiment.

FIG. 6 illustrates a method 600, according to an example embodiment. The method 600 may include various blocks or steps. The blocks or steps may be carried out individually or in combination. The blocks or steps may be carried out in any order and/or in series or in parallel. Further, blocks or steps may be omitted or added to method 600.

The blocks of method 600 may control, include, and/or involve elements of systems 100, 200, 300, 370, 400, and 500 as illustrated and described in reference to FIGS. 1, 2, 3A, 3B, 4, and 5. In some embodiments, some or all blocks of method 600 may be carried out by controller 150.

Block 602 includes selecting a landing station from a plurality of landing stations. Each landing station of the plurality of landing stations is coupled to at least one of: another landing station or an underwater mooring point.

In an example embodiment, the method can optionally include receiving at least one of: wind direction data or position data. Wind direction data can include information indicative of an average wind direction (e.g., in degrees) and optionally information indicative of wind speed. For example, the wind direction data can be received from a weather sensor on a landing station or on an aerial vehicle. The wind direction data may be obtained from other weather information sources.

Position data can include information indicative of a position of the aerial vehicle and/or information indicative of a position of one or more landing stations. The position data may be provided from, for example, a global positioning system (GPS) receiver located on an aerial vehicle or a landing station.

Position data can take other forms and may be obtained in other ways. For example, position data may include information indicative of a relative distance between a given aerial vehicle and a possible landing station. In such a scenario, the position data can include a received signal strength of a navigational radio beacon. As such, the position data may include information indicative of an absolute position of a landing station or a relative position of the landing station with respect to the aerial vehicle.

In an example embodiment, the selection of a landing station can be based on the wind direction data or the position data. That is, the selection of the landing station can be based on the closest possible landing station. Additionally or alternatively, the selection of the landing station can be based on the landing station that is the closest in heading to the prevailing wind direction. Yet further, the selection of the landing station can be performed based on a shortest anticipated amount of time to complete landing operations.

In some cases, the selection of the landing station may be performed based on at least two criteria. For example, the selection of the landing station can be based primarily on the wind direction and secondarily on a landing capacity of the respective landing station. Other criteria are possible and contemplated herein.

Block 604 includes causing an aerial vehicle to land at the selected landing station. As described elsewhere herein, an airframe of the aerial vehicle is coupled to an underwater tether mooring point by a tether. That is, the aerial vehicle is tethered to an underwater location (e.g., a seafloor) and the aerial vehicle may land on a landing station, which may be a floating platform or perch.

Figure 7:
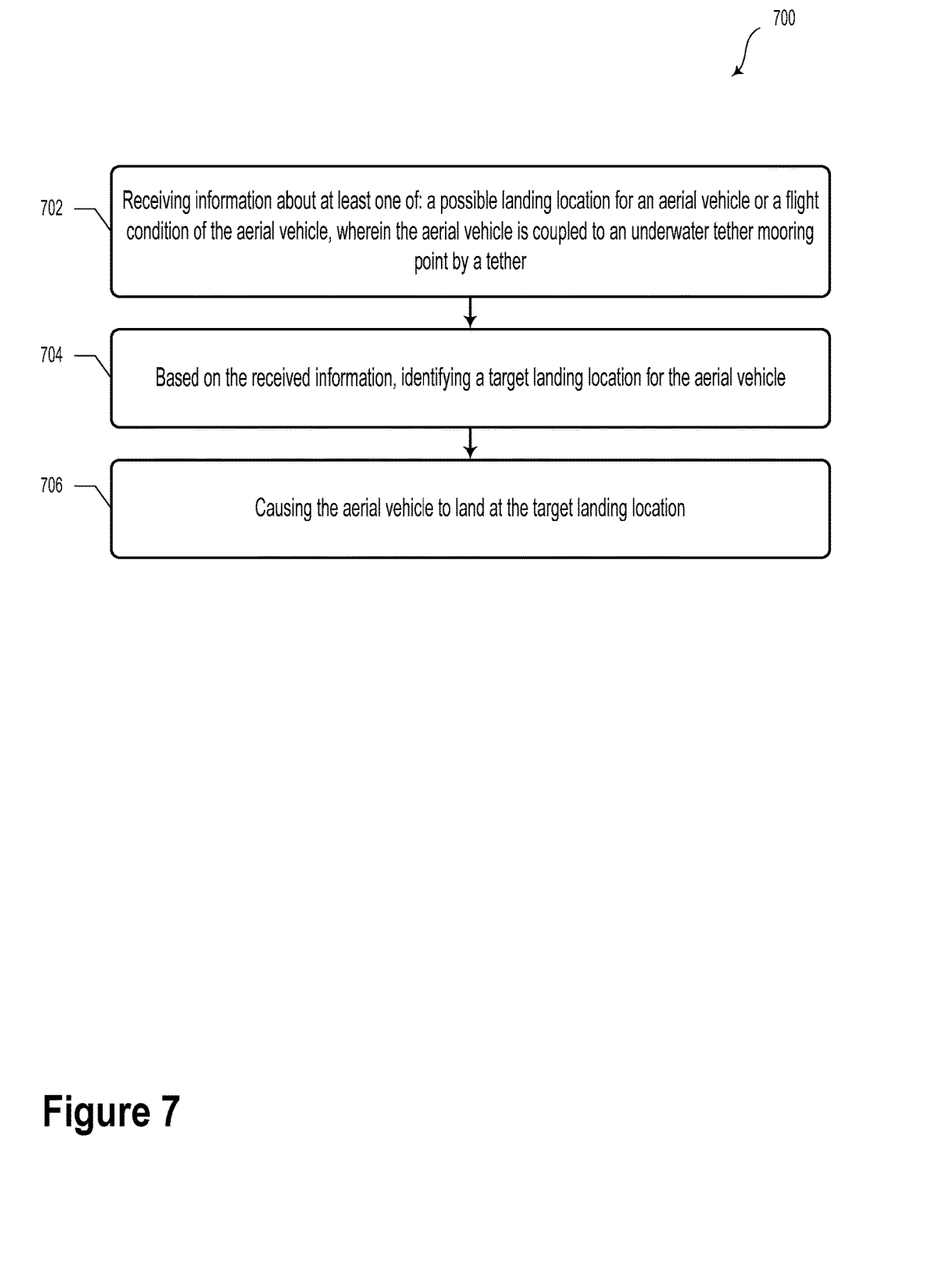
FIG. 7 illustrates a method, according to an example embodiment.

FIG. 7 illustrates a method 700, according to an example embodiment. Method 700 may include various blocks or steps. The blocks or steps may be carried out individually or in combination. The blocks or steps may be carried out in any order and/or in series or in parallel. Further, blocks or steps may be omitted or added to method 700.

The blocks of method 700 may control, include, and/or involve elements of systems 100, 200, 300, 370, 400, and 500 as illustrated and described in reference to FIGS. 1, 2, 3A, 3B, 4, and 5. In some embodiments, some or all blocks of method 700 may be carried out by controller 150.

Block 702 includes receiving information about at least one of: a possible landing location for an aerial vehicle or a flight condition of the aerial vehicle. The aerial vehicle is coupled to an underwater tether mooring point by a tether.

The information about the possible landing location may include, without limitation, at least one of: a position data of the possible landing location, a wind speed at the possible landing location, a wind direction at the possible landing location, or a water condition at the possible landing location. Other types of information about the possible landing location are possible and contemplated herein.

The information about the flight condition of the aerial vehicle may include, without limitation, at least one of: position data of the aerial vehicle, an airspeed of the aerial vehicle, a wind speed at the aerial vehicle, a groundspeed of the aerial vehicle, a heading of the aerial vehicle, a severe weather indication, or a maintenance indication. Other types of information about the flight condition of the aerial vehicle are possible and contemplated herein.

A severe weather indication may be received based on a forecasted weather condition (e.g., wind speed, maximum gust speed, lightning strike probability, etc.) that may be outside the normal operating envelope of the aerial vehicle.

A maintenance indication may be received based on a general or specific maintenance issue with the aerial vehicle. For instance, a maintenance indication may be received in response to a low oil level, a low hydraulic fluid level, a low battery level, or another type of mechanical, electrical or aerodynamic abnormality or emergency.

Block 704 includes based on the received information, identifying a target landing location for the aerial vehicle. Block 704 may include identifying, and selecting from, a plurality of possible landing locations. For example, the received information in Block 702 may include information about a plurality of possible landing locations. In such a scenario, identifying the target landing location may include selecting the target landing location from the plurality of possible landing locations. The target landing location may be identified and/or selected based on, for example, a relative position of the aerial vehicle and a given possible landing location. Alternatively, the target landing location may be identified or selected based on an emergency need. For example, in the case that the aerial vehicle experiences a maintenance or mechanical emergency, method 700 may select a water surface for landing.

Block 706 includes causing the aerial vehicle to land at the target landing location. In an example embodiment, causing the aerial vehicle to land at the target landing location can include causing the aerial vehicle to carry out landing operations so as to land at a landing station or a water surface location.

In some embodiments, the possible landing location(s) may include at least one of: a landing station or a water surface. The landing stations may be is configured to float on a body of water and may be similar or identical to landing station 160 as illustrated and described with regard to FIG. 1.

In an example embodiment, the aerial vehicle may include landing gear and the plurality of landing stations may include respective landing perches. In such a scenario, causing the airframe to land at the selected landing station may include causing the landing gear to couple to the landing perch or landing platform of the selected landing station.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
   a plurality of landing stations, wherein each landing station of the plurality of landing stations is coupled to at least one of: another landing station or an underwater mooring point; and
   an aerial vehicle coupled to a tether mooring point by a tether, wherein at least three landing stations of the plurality of landing stations are arranged about the tether mooring point with a 120 degree azimuth spacing between adjacent landing stations, wherein the aerial vehicle is configured to land on at least one landing station of the at least three landing stations arranged about the tether mooring point.

2. The system of claim 1, wherein each landing station of the at least three landing stations arranged about the tether mooring point comprises a landing perch, wherein the aerial vehicle is configured to couple to the landing perch.

3. The system of claim 1, wherein at least one landing station of the plurality of landing stations comprises a buoy or a floating landing platform.

4. The system of claim 1, further comprising N aerial vehicles, wherein the plurality of landing stations comprises at least N+2 landing stations, wherein N>=1.

5. The system of claim 1, further comprising a plurality of aerial vehicles coupled to respective tether mooring points by respective tethers, wherein the plurality of landing stations comprises a landing station array, wherein the respective tether mooring points are each located within a group of three possible landing stations in the landing station array, wherein at least two landing stations of the group are shared with another aerial vehicle.

6. The system of claim 5, wherein the plurality of landing stations are arranged about the respective tether mooring points at a given distance based on a length of the tether and a depth of the tether mooring point.

7. The system of claim 1, wherein the tether mooring point comprises a direct coupling between the tether and a seafloor surface.

8. The system of claim 1, wherein the aerial vehicle comprises at least one hybrid electric motor configured to generate electricity while the aerial vehicle is operating in a crosswind flight mode.

9. The system of claim 1, wherein the aerial vehicle is electrically coupled to an electrical storage device by the tether.

10. A system comprising:
    an aerial vehicle, wherein the aerial vehicle is coupled to a tether mooring point by a tether, wherein the tether mooring point is underwater; and
    a controller that:
        selects a landing station from a plurality of landing stations, wherein each landing station of the plurality of landing stations is coupled to at least one of: another landing station or an underwater mooring point; and
        causes the aerial vehicle to land at the selected landing station.

11. The system of claim 10, wherein at least one landing station of the plurality of landing stations comprises a buoy or a floating landing platform.

12. The system of claim 10, wherein the plurality of landing stations are arranged about the tether mooring point at a given distance based on a length of the tether and a depth of the tether mooring point.

13. The system of claim 10, wherein the plurality of landing stations comprises three landing stations, wherein the three landing stations are arranged about the tether mooring point with a 120 degree azimuth spacing between adjacent landing stations.

14. The system of claim 10, wherein the tether mooring point comprises a direct coupling between the tether and a seafloor surface.

15. The system of claim 10, wherein the aerial vehicle comprises at least one hybrid electric motor, wherein the aerial vehicle, while operating in a crosswind flight mode, generates electricity using the at least one hybrid electric motor.

16. The system of claim 10, wherein selecting the landing station comprises receiving at least one of: wind direction data or position data, and wherein selecting the landing station is based on the wind direction data or the position data.

17. The system of claim 10, wherein selecting the landing station comprises receiving information indicative of a position of at least one landing station, wherein causing the airframe to land at the selected landing station is based on the received information.

18. A method comprising:
    receiving information about at least one of: one or more landing stations within a plurality of landing stations as a possible landing location for an aerial vehicle or a flight condition of the aerial vehicle, wherein the aerial vehicle is coupled to an underwater tether mooring point by a tether;
    based on the received information, selecting a landing station from the plurality of landing stations as a target landing location; and
    causing the aerial vehicle to land at the target landing location.

19. The method of claim 18, wherein the information about the possible landing location comprises at least one of: position data of the possible landing location, a wind speed at the possible landing location, a wind direction at the possible landing location, or a water condition at the possible landing location.

20. The method of claim 18, wherein the information about the flight condition of the aerial vehicle comprises at least one of: position data of the aerial vehicle, an airspeed of the aerial vehicle, a wind speed at the aerial vehicle, a groundspeed of the aerial vehicle, a heading of the aerial vehicle, a severe weather indication, or a maintenance indication.

\* \* \* \* \*